United States Patent [19]

Acevedo

[11] Patent Number: 5,348,260
[45] Date of Patent: Sep. 20, 1994

[54] MOVABLE SUPPORTING ARM

[75] Inventor: Rodolfo J. Acevedo, Alta Loma, Calif.

[73] Assignee: Hughes Aircraft Company, Los Angeles, Calif.

[21] Appl. No.: 15,955

[22] Filed: Feb. 8, 1993

[51] Int. Cl.⁵ .............................. E04G 3/00
[52] U.S. Cl. .................. 248/280.1; 248/123.1
[58] Field of Search .......... 248/280.1, 281.1, 278, 248/276, 279, 585, 594, 123.1, 162.1, 282, 284; 359/384

[56]  References Cited

U.S. PATENT DOCUMENTS 2,572,231 10/1951 Woodward .......... 248/276
5,037,053 8/1991 Fox et al. .......... 248/281.1 X

OTHER PUBLICATIONS

Marus Dental Products (1979).

Primary Examiner—Ramon O. Ramirez
Attorney, Agent, or Firm—Leonard A. Alkov; W. K. Denson-Low

[57] ABSTRACT

The movable supporting arm is mounted on a pivot pin at its inner end on a wall or base. The outer end is spring counter-balanced by an adjustable spring and there is a friction brake which controls movement and locks the arm in position. The friction brake and arm can both be mounted with the same hand so that the supporting arm can be moved into position and locked in position.

18 Claims, 5 Drawing Sheets

MOVABLE SUPPORTING ARM

FIELD OF THE INVENTION

This invention is directed to an ergonomic fully articulating supporting arm with one hand operation for supporting devices at the work place, such as a microscope. The movable supporting arm folds away when not in use so as to free the work station for other purposes.

BACKGROUND OF THE INVENTION

When working on small products, microscopies are typically employed. The microscope must be properly and firmly positioned in order to be of convenience. A modern-day work space microscope stand is typically a weighted base. The base is up to 12 inch square in order to provide stability. The typical base weighs about 35 pounds in order to provide this stability. Such a base stands on the work surface and, thus, occupies as much as 1 square foot of work station space. The adjustment of such an arm is accomplished by loosening two hand knobs and manually pulling the arm to the desired position, followed by clamping the two hand knobs. This is two-handed operation of the arm, which makes for difficulty when a hand is also needed otherwise in the positioning operation. Such arms are often used for the mounting and positioning of a microscope, which may be a binocular zoom microscope which requires manual operation of both the focus and the zoom. To position the microscope correctly, focus and zoom must be adjusted while the microscope is put into position, in order to ascertain that the position is correct.

A fully positionable supporting arm, which is mounted on a small post, provides safety because there is no danger of tipping of the structure when it is fully extended. Safety is also enhanced by the proper positioning of the arm, especially when it carries such a device as a microscope, to eliminate neck and back fatigue. The proper positioning of the binocular eyepieces in a microscope reduces eye fatigue and parallax errors and are achieved when the microscope is maintained in the correct position with respect to the work surface and the work piece. It is also convenient to have a support arm which can be moved away with a single motion so that the structures supported on the arm do not interfere with access to the work station surface. In addition, proper design of a movable supporting arm will accommodate a person of any size without having to purchase special equipment, such as benches or chairs of differing height. These are desirable results which can be achieved by a proper movable supporting arm.

SUMMARY OF THE INVENTION

In order to aid in the understanding of this invention, it can be stated in essentially summary form that it is directed to a movable supporting arm which is of parallelogramic structure which has a spring connected thereto in adjustable fashion to provide a counter-balance force, together with a clamp which clamps the relative parallelogramic parts to clamp the arm in position.

It is thus a purpose and advantage of this invention to provide a movable supporting arm particularly useful at a work station so that equipment can be supported on the arm and positioned with respect to the work station.

It is another purpose and advantage of this invention to provide a movable supporting arm which can be operated with one hand to position and retain a device at a work station.

It is a further purpose and advantage of this invention to provide a movable supporting arm which has a clamp thereon which can vary the clamping force so that the supporting arm can be placed in a new position and retained there without clamp adjustment.

It is a further purpose and advantage of this invention to provide a movable supporting arm which occupies a minimum amount of the work station space so that a device can be supported with respect to the work station without occupying significant work surface space.

Other purposes and advantages of this invention will become apparent from a study of the following portion of the specification, the claims and the attached drawings wherein:

BRIEF DESCRIPTION OF THE DRAWINGS

FIG. 6 is an enlarged section through the arm taken generally along line 6—6 of FIG. 3.

DESCRIPTION OF THE PREFERRED EMBODIMENT

Figure 1:
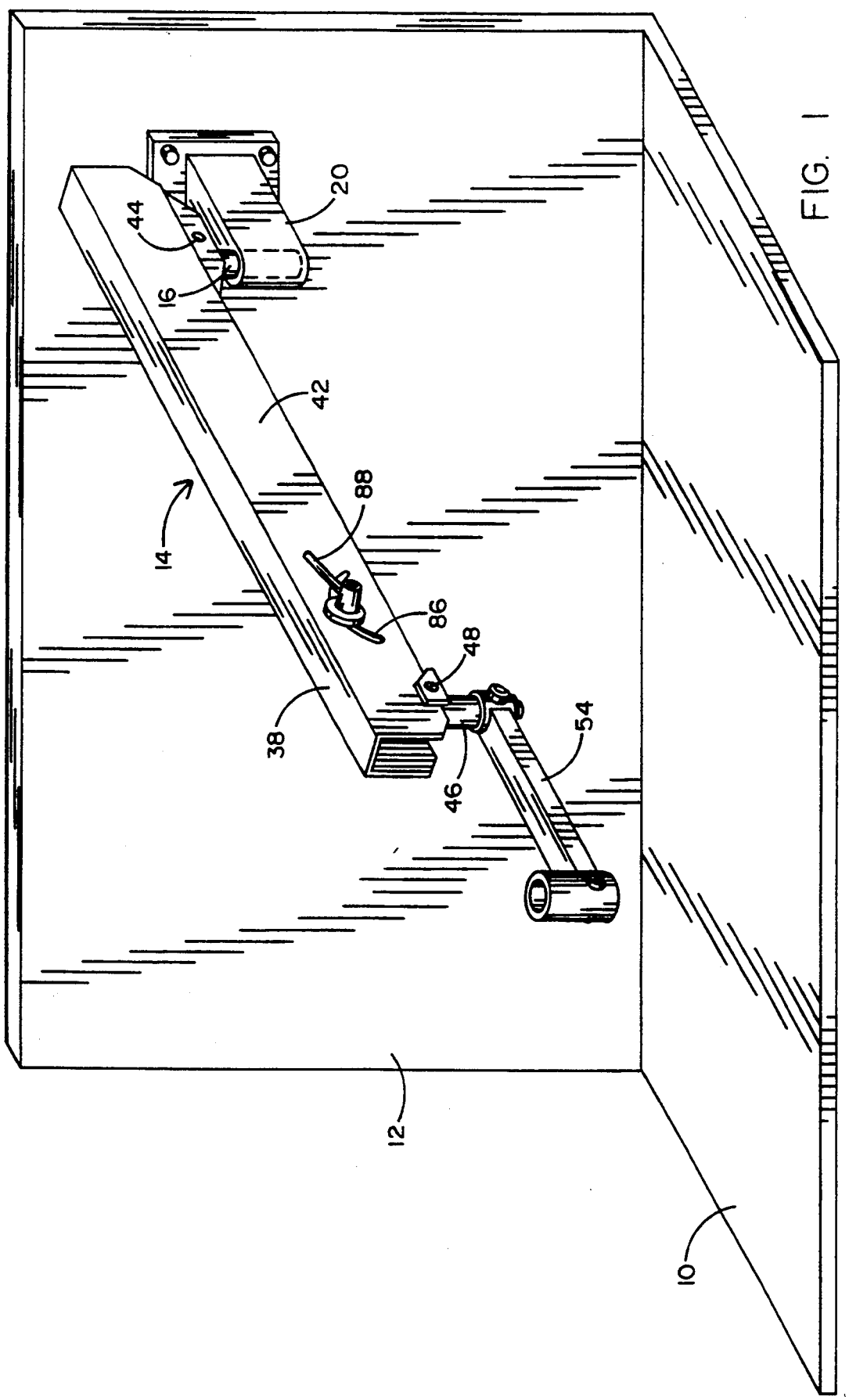
FIG. 1 is a perspective view of a movable supporting arm, in accordance with this invention, shown in association with a work space.
Figure 2:
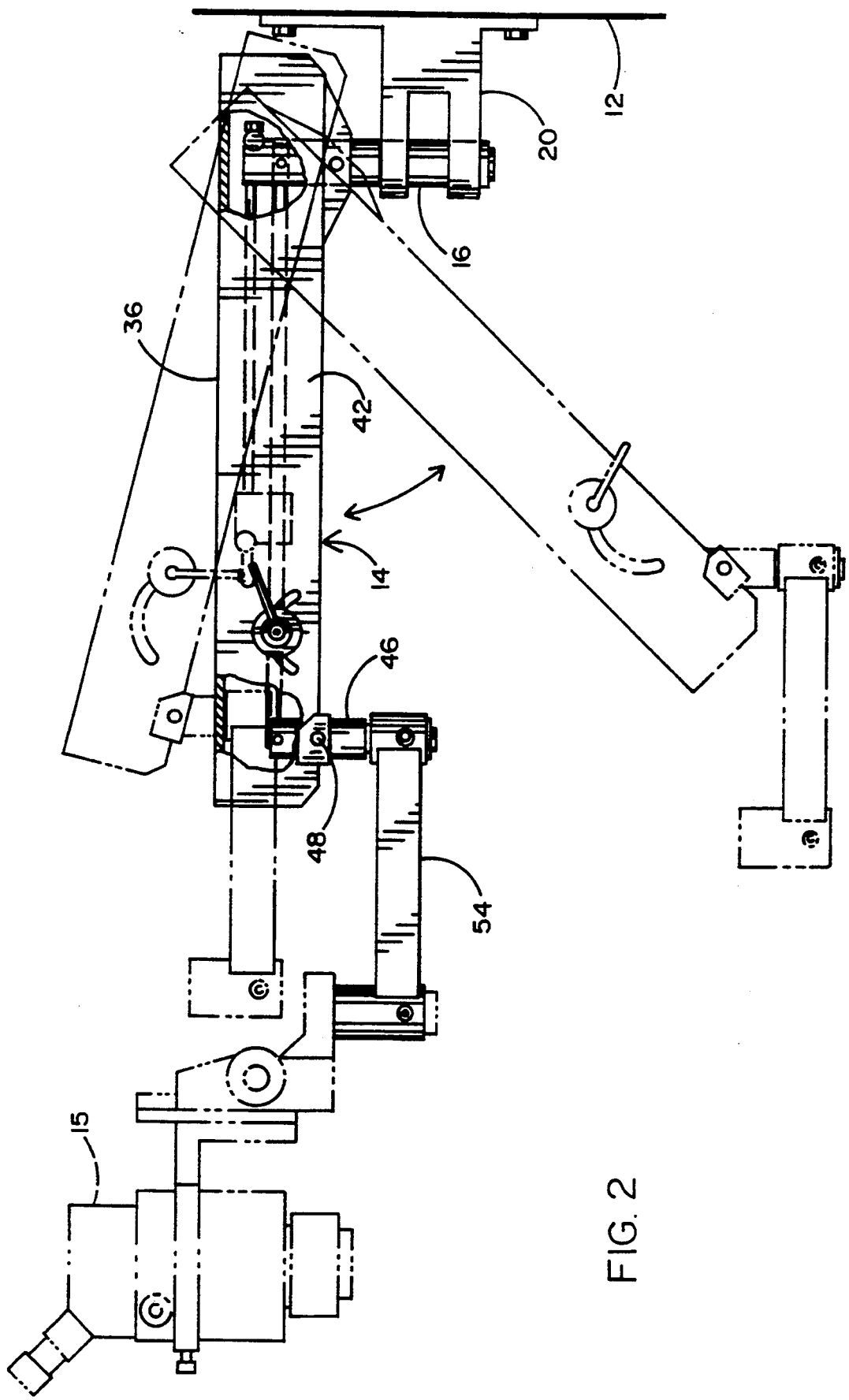
FIG. 2 is an enlarged side-elevational view, with parts broken away, parts taken in section, and alternative positions and associated equipment shown in dashed lines.
Figure 3:
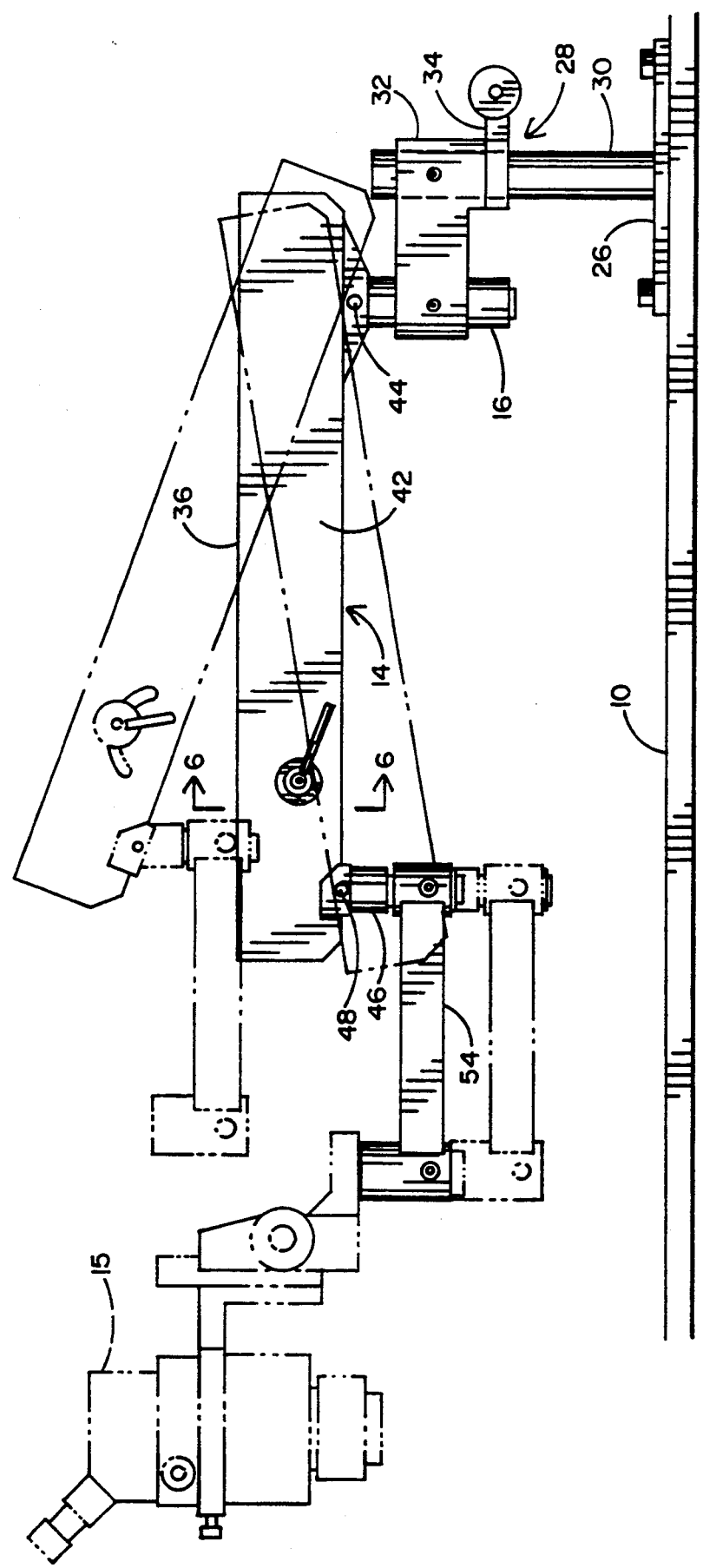
FIG. 3 is a view similar to FIG. 2 showing the movable supporting arm mounted on a stand secured to the work station surface.

FIG. 1 shows a work station having work surface 10 and a back wall 12. The back wall is also shown in FIG. 2. The work surface is also shown in FIG. 3. The work surface is used to perform various different steps on a work piece. The work piece may be very small. In order to watch the work being performed and in order to inspect the work piece and the work done thereon, a binocular zoom microscope 15, such as that shown in FIGS. 2 and 3, may be employed. In order to inspect the work being done, the movable supporting arm 14 of this invention is provided. Pivot post 16 has a pivot surface 18, see FIGS. 4 and 5, which enters down through a pivot opening in mounting bracket 20, see FIGS. 1 and 2. The mounting bracket has a cylindrical hole downwardly therethrough which receives the cylindrical pivot surface so that the pivot pin can rotate thereon. Shoulder 22 engages on the top of mounting bracket 20 to limit the downward insertion of the pivot post into the mounting bracket. If desired, a snap ring may be inserted into the snap ring groove 24, see FIG. 5, to restrain the pivot post from removal. The mounting bracket 20 is secured to the back wall 12 by any convenient means and is secured in a position so that the arm 14 can swing over most of the work surface 10.

While mounting on the back wall 12 is desired in order to prevent obstruction of the work surface 10, in some cases it may be desirable to mount the arm from the work surface. This eventuality is illustrated in FIG. 3. It may occur where there is no back wall on the work station. In this case, foot 26 on mounting bracket 28 is attached to the work surface 10 of the work station. Post 30 is secured to the foot 26 and extends upwardly. Clamp arm 32 is clamped at a selected height on post 30 and is clamped in that position by means of clamp 34. The clamp arm 32 has an upright opening therein which receives the pivot surface of pivot post 16. The shoulder 22 limits downward motion and supports the weight of arm 14.

Arm 14 has an elongated, inverted channel-shaped housing 36, see FIG. 6. The housing 36 has a top 38 and side walls 40 and 42. Pivot pin 44, see FIGS. 1, 3, 4 and 5, extends through corresponding pivot openings in side walls 40 and 42, as well as through pivot post 16. The arm 14 is free to pivot up and down on pivot pin 44, as seen in full and dashed lines in FIGS. 2 and 3.

Figure 4:
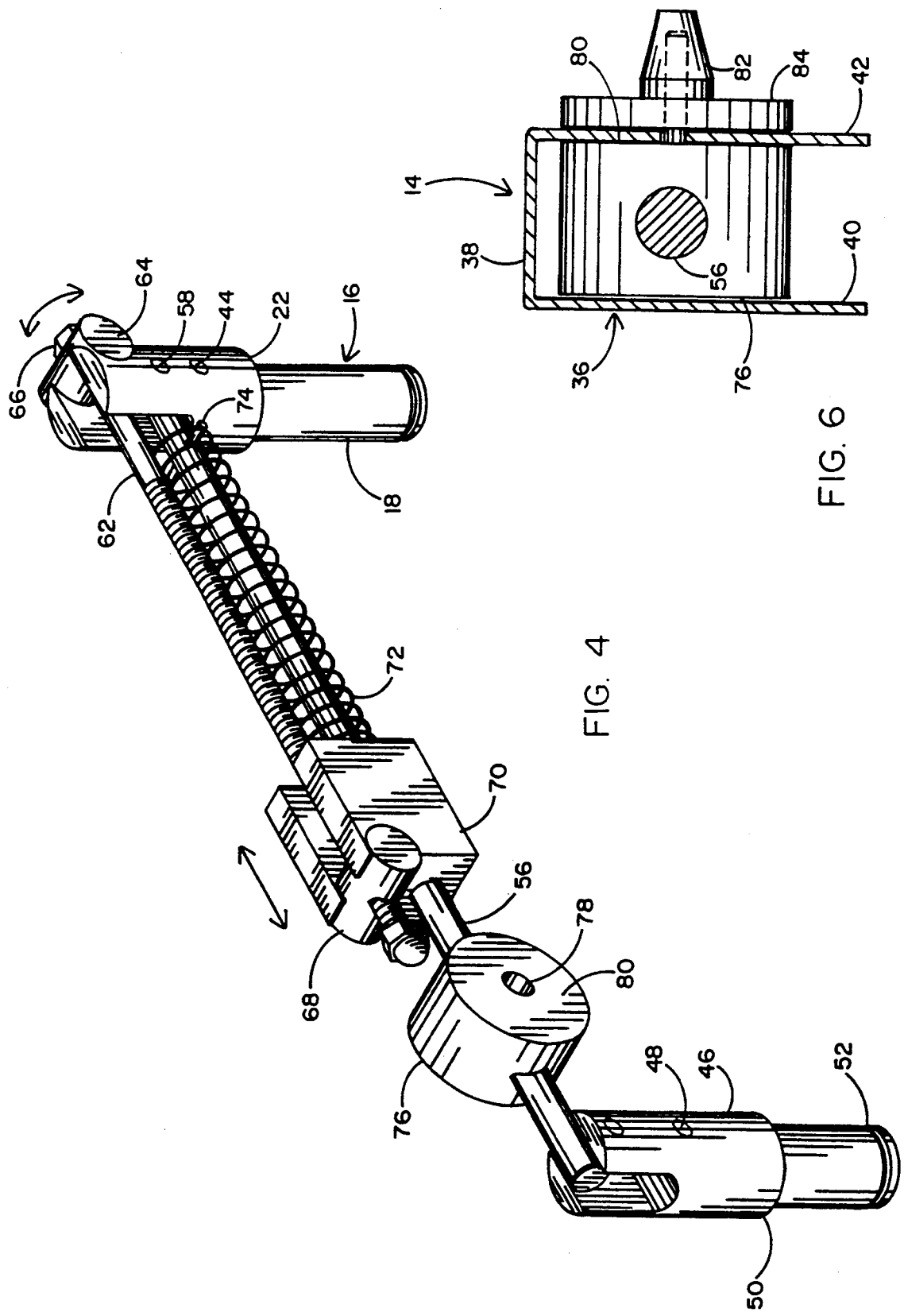
FIG. 4 is an isometric view of a portion of the internal mechanism of the movable supporting arm.
Figure 5:
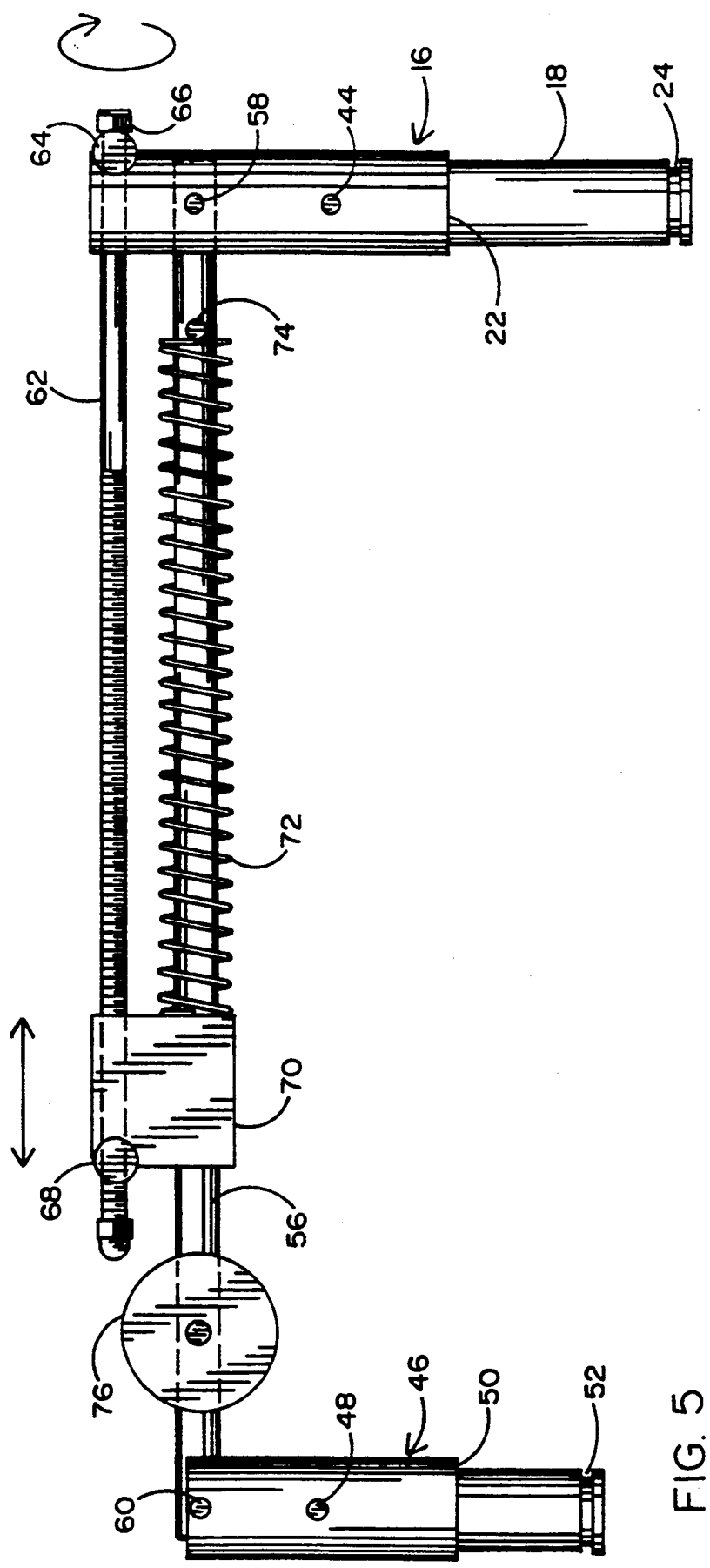
FIG. 5 is a side-elevational view of the structure of FIG. 4.

Mounting post 46, seen best in FIGS. 4 and 5, is carried on the pivot pin 48, which extends through both side walls 40 and 42, as well as through mounting post 46. In this way, the mounting post can pivot with respect to the housing 36. The mounting post 46 has a shoulder 50 thereon and a snap ring groove 52 below the shoulder so that a swing arm 54 may be mounted thereon. The swing arm may have any convenient mounting means thereon, such as a mounting socket, as illustrated in FIG. 1. The microscope 15 may be mounted on the swing arm 54 in any convenient manner.

Connecting rod 56, best seen in FIGS. 4 and 5, is pivoted to posts 16 and 46. Both of the posts are bifurcated, and the connecting rod lies in the bifurcations. Pivot pin 58 engages through the pivot post 16 and through the end of the connecting rod. On the other hand, pivot pin 60 engages through mounting post 46 and the other end of the connecting rod 56. The distance between pivot pins 44 and 58 equals the distance between pivot pins 48 and 60. Additionally, the distance between pivot pins 44 and 48 equals the distance between pivot pins 58 and 60. Thus, a parallelogramic structure is created and the axis of mounting post 46 is parallel to the axis of pivot post 16. It is preferable that the axis of pivot post 16 be held vertical by means of its mounting brackets 20 and 28.

As seen in FIGS. 4 and 5, adjustment screw 62 passes through an opening and tension block 64. The tension block is a solid cylinder resting in the cylindrical seat on the right side of pivot post 16, as seen in FIGS. 4 and 5. The tension block has a clearance opening therein through which the adjustment screw passes. The adjustment screw 62 has a hex head 66 which engages against the tension block 64. The adjustment screw is threadedly engaged in a threaded cross hole in tension block 68. The tension block 68 is a solid circular cylinder with the threaded hole passing therethrough on a diameter. Tension block 68 sits in a cylindrical seat in spring block 70. The spring block 70 has a clearance hole therethrough which embraces connecting rod 56. The spring block is slidable along the length of the connecting rod. Compression spring 72 is engaged against spring block 70 and against cross pin 74 through connecting rod 56 just away from pivot post 16. When pivot post 16 is held still and mounting post 46 moves down, spring block 70 moves to the right on connecting rod 56, as the structure is viewed in FIGS. 4 and 5. This compresses spring 72. Thus, the compression force in spring 72 urges mounting post 46 in the upward direction. With an appropriate choice of spring and appropriate adjustment of the spring by positioning of spring block 70 by rotation of adjusting screw 62, a counter-balancing force can be applied at the mounting post 46 to counterbalance the weight of the supporting arm and the weight of the equipment mounted thereon.

Connecting rod 56 carries brake pad 76. Brake pad 76 has a threaded opening 78 therein. The brake pad is fixed on the connecting rod and has a brake surface 80 which lies against the inside of side wall 42, see FIG. 6. Bolt head 82 engages on washer 84, which lies against the outside of side wall 42. The bolt under the bolt head passes through arcuate slot 86 and engages in the threads in opening 78. The head has a convenient handle 88 thereon, see FIG. 1, for tightening the bolt. Tightening of the bolt clamps the washer 84 and brake pad 76 against the outside and inside of the wall 44. Appropriate brake surfaces can be provided so that sliding adjustment can be achieved. In some cases, it is desirable to lock the brake tight and, in some cases to apply some friction but permit sliding. The arcuate slot 86 is on a radius equal to the distance between pins 48 and 60 so that the brake bolt moves smoothly around the arc. In other cases, it is desirable to move the arm up and/or down, and this can be accomplished with the brake lightly applied to permit sliding motion. Furthermore, in positioning the arm, one hand can grasp the bolt head and handle and slightly loosen the brake while the same hand positions the arm. When positioned, the brake can be tightened and clamped. Thus, the arm can be positioned while the other hand is occupied with other arm-positioning tasks, such as focusing the microscope to assure that the microscope is properly positioned before clamping the arm. One-handed, smooth operation is achieved.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A positionable supporting arm comprising:
   a pivot post, means for engaging said pivot post for supporting said arm;
   an arm housing adjacent said pivot post, a pivot pin engaging said pivot post and said arm housing;
   a mounting post, a pivot pin engaging said arm housing and said mounting post;
   a connecting rod, a pivot pin interconnecting said connecting rod and said pivot post, a pivot pin interconnecting said connecting rod and said mounting post, said pivot pins being positioned so that said mounting post always lies substantially parallel to said pivot post;
   a counter-balance spring engaged between said connecting rod and one of said posts so as to urge said mounting post upward when said pivot posts and said mounting posts are in an upright position, wherein said counter-balance spring includes a spring block movably mounted with respect to said connecting rod, and further includes means to position said spring block at a selected position with respect to said pivot post, and wherein said spring block comprises a threaded screw engaged between said pivot post and said tension block and said spring is a compression spring; and
   means interconnecting said connecting rod and said arm housing to claim said connecting rod to said arm housing to position said mounting post in a selected position.

2. The supporting arm of claim 1 wherein a brake pad is secured to said connecting rod and there is means interengaging said brake pad and said arm housing to clamp said arm housing to said brake pad to lock said mounting post in position.

3. The supporting arm of claim 1 wherein said spring is a compression spring engaged between said spring block and a spring stop on said connecting rod.

4. The supporting arm of claim 2 wherein said brake pad clamping means comprises a manual handle externally of said arm housing, said manual handle having a threaded shank threadedly engaged with said brake pad so that rotation of said manual handle clamps said arm housing to said brake pad.

5. The supporting arm of claim 4 wherein said spring adjustment means includes a spring block movably mounted with respect to said connecting rod.

6. The supporting arm of claim 1 wherein said threaded screw is pivotally mounted with respect to said pivot post and is pivotally mounted with respect to said spring block.

7. The supporting arm of claim 6 wherein said pivotal engagement of said threaded screw comprises first and second cylindrical tension blocks, a clearance opening through said first tension block and a threaded opening through said second tension block, a head on said threaded screw, said threaded screw passing through said clearance hole in said first tension block and said head engaging thereagainst, said threaded screw being threadedly engaged in said second tension block.

8. The supporting arm of claim 7 wherein said first and second tension blocks are respectively positioned against substantially cylindrical surfaces on said pivot post and on said spring block.

9. The supporting arm of claim 5 wherein said spring is a compression spring engaged between said spring block and a spring stop on said connecting rod.

10. The supporting arm of claim 5 wherein said spring adjustment means includes means to position said spring block at a selected position with respect to said pivot post.

11. The supporting arm of claim 10 wherein said positioning means for said spring block comprises a threaded screw engaged between said pivot post and said spring block and said spring is a compression spring.

12. The supporting arm of claim 11 wherein said threaded screw is pivotally mounted with respect to said pivot post and is pivotally mounted with respect to said spring block.

13. A supporting arm comprising:
an arm housing;
a pivot post, a pivot pin pivotally mounting said pivot post to said arm housing;
a mounting post, a pivot pin pivotally mounting said mounting post to said arm housing, said arm housing being an inverted U-shaped housing with side walls, said pivot post and said mounting post extending into said arm housing between said side walls, said pivot pins engaging through said side walls, said pivot posts and said mounting post being bifurcated between said arm housing side walls;
a connecting rod, said connecting rod being positioned within said arm housing and lying within said bifurcated pivot post and bifurcated mounting post, a pivot pin pivotally interconnecting said connecting rod to said pivot post and a pivot pin pivotally interconnecting said connecting rod to said mounting post, said pivot pins being so positioned that said posts lie substantially parallel to each other;
means interconnecting one of said posts and said connecting rod to urge said mounting post upward when said mounting post and said pivot posts are in an upright position, said means comprising a spring block slidably mounted on said connecting rod, a compression spring engaged between said spring block and said connecting rod and an adjustable tension screw engaged between said pivot post and said spring block; and
means to clamp said connecting rod to said arm housing when said mounting post is in a selected position.

14. The supporting arm of claim 13 wherein there is a cylindrical tension block engaged against said spring block and there is a cylindrical tension block engaged against said pivot post and said adjusting screw engages both of said tension blocks to adjust the position of said spring block with respect to said pivot post.

15. The supporting arm of claim 13 wherein there is a brake pad mounted on said connecting rod and there is a brake handle exteriorly of said arm housing, said brake handle engaging said brake pad to clamp said brake pad with respect to said arm housing to lock said mounting post in position with respect to said pivot post.

16. The supporting arm of claim 15 wherein said manually operable brake handle has a washer and a brake pad thereon engaging exteriorly of said arm housing so that supporting arm can be positioned and locked in position by a single hand engaging said arm housing and said brake handle.

17. The supporting arm of claim 15 wherein said means for urging said mounting post upward comprises a spring block slidably mounted on said connecting rod, a compression spring engaged between said spring block and said connecting rod and an adjustable tension screw engaged between said pivot post and said spring block.

18. The supporting arm of claim 17 wherein there is a cylindrical tension block engaged against said spring block and there is a cylindrical tension block engaged against said pivot post and said adjusting screw engages both of said tension blocks to adjust the position of said spring block with respect to said pivot post.

* * * * *